United States Patent
Shimakura et al.

(10) Patent No.: US 6,572,983 B2
(45) Date of Patent: Jun. 3, 2003

(54) METHOD FOR TREATING METALLIC SURFACES

(75) Inventors: Toshiaki Shimakura, Frankfurt am Main (DE); Motohiro Sasaki, Kanagawa (JP); Katsuyoshi Yamasoe, Chiba (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/793,709

(22) Filed: Feb. 27, 2001

(65) Prior Publication Data

US 2001/0054455 A1 Dec. 27, 2001

(30) Foreign Application Priority Data

Feb. 29, 2000 (JP) ........................................ 2000-053009

(51) Int. Cl.$^7$ ............................. B05D 3/10; B05D 3/02; B05D 1/36; B32B 15/00
(52) U.S. Cl. ..................... 428/681; 427/337; 427/344; 427/376.1; 427/404; 427/419.1
(58) Field of Search ................................ 427/337, 344, 427/376.1, 402, 404, 419.1; 428/681; 148/259, 255

(56) References Cited

U.S. PATENT DOCUMENTS 6,096,139 A * 8/2000 Shimakura et al. ......... 148/251

FOREIGN PATENT DOCUMENTS

| DE | 196 23 268 | 12/1996 |
|---|---|---|
| EP | 0358 338 | 3/1990 |
| EP | 358 338 A3 * | 3/1990 |
| EP | 0 551 568 | 7/1993 |
| EP | 0 949 353 | 10/1999 |
| EP | 0952 193 | 10/1999 |
| WO | WO 95/09934 | 4/1995 |
| WO | WO 99/67444 | 12/1999 |

OTHER PUBLICATIONS

No. XP–002185228, Database WPI, Derwent Publications Ltd. AN 1998.
No. XP–002185229, Database WPI, Derwent Publications Ltd. AN 1996.
No. XP–002185230, Database WPI, Derwent Publications Ltd. AN 1994.
No. XP–002185231, Database WPI, Derwent Publications Ltd. AN 1978.
European Search Report, Application No. EP 01 40 0497.

* cited by examiner

Primary Examiner—Michael Barr
(74) Attorney, Agent, or Firm—Sughrue Mion, PLLC

(57) ABSTRACT

A method of treating a metallic surface which comprises treating a metal-coated steel panel with a nonchromate metallic surface treating agent containing, in each liter thereof, (a-1) a silane coupling agent and/or a hydrolytic condensation product thereof, (a-2) water-dispersible silica in a proportion, and (a-3) a zirconium compound and/or a titanium compound, drying the treated steel panel and coating it with an anticorrosion coating agent containing, in each liter of an aqueous resin solution or dispersion, (b-1) a silane coupling agent and/or a hydrolytic condensation product thereof, (b-2) water-dispersible silica and (b-3) at least one phosphorus-containing ion selected from among phosphate ion, phosphite ion and hypophosphite ion.

11 Claims, No Drawings

METHOD FOR TREATING METALLIC SURFACES

FIELD OF THE INVENTION

The present invention relates to a method for surface treatment of metals, particularly metal-coated steel panels such as zinc-plated, aluminum-plated or tin-plated steel panels.

PRIOR ART

As the metallic surface treating agent, a chromium-containing surface treating agent such as a chromate system or a phosphate-chromate system has heretofore been used broadly and still in use today. However, in view of the recent trend toward more stringent regulatory control for environmental protection, it is likely that the use of such coating systems will be restricted for fear of the toxicity, particularly carcinogenicity, of chromium. Therefore, development of a rust-preventing agent not containing chromium and yet as effective as the chromating agent in imparting corrosion resistance has been awaited. As disclosed in Japanese Kokai Publication Hei-11-29724, the inventors of the present invention previously developed a nonchromate rust-preventing agent comprising an aqueous resin and, as incorporated therein, a thiocarbonyl group-containing compound, a phosphate ion, and water-dispersible silica. Regrettably, however, this system was found to be deficient in storage stability and somewhat poor in corrosion resistance at thin coating thickness. Meanwhile, with regard to silane coupling agents, an acidic surface treating agent containing two dissimilar silane coupling agents is disclosed in Japanese Kokai Publication Hei-8-73775. However, this system is intended to improve finger-print resistance and overcoat adhesion and is quite deficient in corrosion resistance for use in applications where high corrosion resistance and good processability are required after such metallic surface treatment as in the present invention. Moreover, Japanese Kokai Hei-10-60315 discloses a steel structure surface treating agent, which contains a silane coupling agent having a certain functional group reactive with an aqueous emulsion, but the corrosion resistance required here is only that of a degree satisfying comparatively mild test requirements such as those of wet tests and as far as corrosion resistance is concerned, the system is a far cry from a rust-preventing agent system as provided by the present invention. With the above state of the art by way of background, there has been a standing demand for development of a rust-preventing agent expressing sufficient corrosion resistance and overcoat adhesion at thin coating thickness.

SUMMARY OF THE INVENTION

The present invention has for its object to provide a method of treating a metallic surface which is suited for application to metals, particularly zinc-plated steel panels, and despite the absence of chromium therein, is capable of imparting high processability and corrosion resistance to steel panels, and a treated steel panel obtainable by said method.

The method of treating a metallic surface according to the present invention comprises treating a metal-coated steel panel with a nonchromate metallic surface treating agent containing, in each liter thereof, (a-1) a silane coupling agent and/or a hydrolytic condensation product thereof in an amount of 0.01 to 100 g/l, (a-2) water-dispersible silica in a proportion of 0.05 to 100 g/l (solids), and (a-3) a zirconium compound in an amount of 0.01 to 50 g/l in terms of zirconium ion and/or a titanium compound in an amount of 0.01 to 50 g/l in terms of titanium ion, drying the treated steel panel and coating it with an anticorrosion coating agent containing, in each liter of an aqueous resin solution or dispersion, (b-1) a silane coupling agent and/or a hydrolytic condensation product thereof in an amount of 0.1 to 50 g/l, (b-2) water-dispersible silica in an amount of 10 to 500 g/l (solids) and (b-3) at least one phosphorus-containing ion selected from among phosphate ion, phosphite ion and hypophosphite ion in an amount of 0.1 to 10 g/l.

The nonchromate metallic surface treating agent for use in the present invention further contains one or more members selected from among sulfide ion, thiosulfate ion, persulfate ion and a triazinethiol compound in an amount of 0.01 to 100 g/l.

In an alternative mode of practicing the method of treating a metallic surface according to the present invention, said anticorrosion coating agent further contains one or more members selected from among sulfide ion, thiosulfate ion, persulfate ion and a triazinethiol compound in an amount of 0.01 to 100 g/l.

The present invention is further directed to a method of treating a metallic surface which comprises using an anticorrosion coating agent obtainable by adding said components (b-1) and (b-2) to said aqueous resin solution or dispersion and reacting them at a temperature not less than 50° C. and not more than the boiling temperature of the resin composition. This method is most suited for surface treatment of zinc-coated steel panels.

The present invention is further directed to a nonchromate-treated steel panel as obtainable by any of the above methods.

DETAILED DESCRIPTION OF THE INVENTION

The metallic surface treating agent, which is used in the first place in the present invention, contains a silane coupling agent and/or a hydrolytic condensation product thereof as one of its essential components silane compounds. The hydrolytic condensation product of a silane coupling agent means an oligomer obtainable by hydrolytic polymerization of the silane coupling agent.

The silane coupling agent which can be used as above in the present invention is not particularly restricted but includes the following, among others: vinylmethoxysilane, vinyltrimethoxysilane, vinylethoxysilane, vinyltriethoxysilane, 3-aminopropyltriethoxysilane, 3-glycidoxypropyltrimethoxysilane, 3-methacryloxypropyltrimethoxysilane, 3-mercaptopropyltrimethoxysilane, N-(1,3-dimethylbutylidene)-3-(triethoxysilyl)-1-propanamine, N,N'-bis[3-(trimethoxysilyl)propyl]ethylenediamine, N-(.-aminoethyl)-.-aminopropylmethyldimethoxysilane, N-(.-aminoethyl)-.-aminopropyltrimethoxysilane, .-aminopropyltrimethoxysilane, .-aminopropyltriethoxysilane, .-glycidoxypropyltrimethoxysilane, .-glycidoxypropyltriethoxysilane, .-glycidoxypropylmethyldimethoxysilane, 2-(3,4-epoxycyclohexyl)ethyl-trimethoxysilane, .-methacryloxypropyltrimethoxysilane, .-methacryloxypropyltriethoxysilane, .-mercaptopropyltrimethoxysilane, .-mercaptopropyltriethoxysilane and N-[2-(vinylbenzyl-amino)ethyl]-3-aminopropyltrimethoxysilane.

The particularly preferred silane coupling agent includes vinylmethoxysilane, vinylethoxysilane, 3-aminopropyltriethoxysilane, 3-glycidoxypropyltrimethoxysilane, 3-methacryloxypropyltrimethoxysilane, 3-mercaptopropyltrimethoxysilane, N-(1,3-dimethylbutylidene)-3-(triethoxysilyl)-1-propanamine and N,N'-bis[3-(trimethoxysilyl)propyl]ethylenediamine. These silane coupling agents can be used each alone or in a suitable combination.

In the present invention, said silane compound is caused to be present in a concentration of 0.01 to 100 g/l, preferably 0.5 to 25 g/l, in [each liter of] the metallic surface treating agent. If the concentration of the silane coupling compound is less than 0.01 g/l, the corrosion resistance- and adhesion-enhancing effect of the nonchromate rust-preventive coating agent will be deficient. If the use of the silane coupling compound exceeds 100 g/l, the corrosion resistance-enhancing effect will not be improved any further but rather a cost disadvantage will result.

The metallic surface treating agent of the present invention contains water-dispersible silica. The water-dispersible silica which can be used in the present invention is not particularly restricted but is preferably spherical silica, chainlike silica or aluminum-modified silica, which is lean in sodium and other impurities and weakly basic. The spherical silica includes colloidal silicas such as "SnowtexN" and "Snowtex UP" (both manufactured by Nissan Chemical) and fumed silica such as "Aerosil" (Japan Aerosil); the chain like silica includes silica gel such as "Snowtex PS", (Nissan Chemical); and the aluminum-modified silica includes "AdeliteAT-20A" (AsahiDenka), all of which are commercially available.

The water-dispersible silica is caused to be present in a proportion of 0.05 to 100 g/l, preferably 0.5 to 60 g/l, on a solid basis, in each liter of the metallic surface treating agent. If the proportion of water-dispersible silica is less than 0.05 g/l, the corrosion resistance will be insufficient, while the use of silica is in excess of 100 g/l will not be rewarded with any further improvement in corrosion resistance but rather detract from the bath stability of the metallic surface treating agent.

The metallic surface treating agent of the present invention further contains a zirconium compound and/or a titanium compound. The zirconium compound includes ammonium zirconyl carbonate, zirconiumhydrofluoride, ammonium zirconium fluoride, potassium zirconium fluoride, sodium zirconium fluoride, zirconium acetylacetonate, zirconium butoxide-1-butanol solution, zirconium n-propoxide and soon. The titanium compound includes titanium hydrofluoride, ammonium titanium fluoride, potassium titanium oxalate, potassium titanium fluoride, sodium titanium fluoride, titanium isopropoxide, isopropyl titanate, titanium ethoxide, titanium 2-ethyl-1-hexanolate, tetraisopropyl titanate, tetra-n-butyl titanate and so on. These compounds may be used each alone or in a suitable combination.

The above-mentioned zirconium compound and/or titanium compound is caused to be present, in each liter of the metallic surface treating agent of the invention, in a concentration of 0.01 to 50 g/l in terms of zirconium ion or titanium ion. If the concentration of the above compound falls less than 0.01 g/l, corrosion resistance will become insufficient. If it exceeds 50 g/l, no improvement will be realized in overcoat adhesion and, in addition, the bath stability will be rather decreased.

The metallic surface treating agent of the present invention further contains at least one sulfur-containing compound selected from the group consisting of a sulfide, a thiosulfate, a persulfate and a triazinethiol compound, and these compounds contribute to corrosion resistance.

The sulfide mentioned above includes sodium sulfide, ammonium sulfide, manganese sulfide, molybdenum sulfide, iron sulfide and vanadium sulfide, among others.

The thiosulfate includes ammonium thiosulfate, sodium thiosulfate and potassium thiosulfate, among others.

The persulfate includes ammonium persulfate, sodium persulfate and potassium persulfate, among others.

The triazinethiol compound includes 2,4,6-trimercapto-S-triazine, 2-butylamino-4,6-dimercapto-S-triazine, 2,4,6-trimercapto-S-triazine monosodium salt, 2,4,6-trimercapto-S-triazine trisodium salt, 2-anilino-4,6-dimercapto-S-triazine, and 2-anilino-4,6-dimercapto-S-triazine monosodium salt, among others.

These compounds can be used each alone or in a suitable combination.

The concentration of the above sulfur-containing compound(s) in the metallic surface treating agent, per liter of the composition, is 0.01 to 100 g/l in terms of a total amount of sulfide ion, thiosulfate ion, persulfate ion and a triazinethiol compound. If the concentration of said ion(s) is less than 0.01 g/l, the expected corrosion resistance-enhancing effect will not be expressed. On the other hand, if the upper limit of 100 g/l is exceeded, the corrosion resistance-enhancing effect will not be improved any further and rather an economic disadvantage will result.

The metallic surface treating agent according to the present invention may be further supplemented with phosphate ions. Compounds capable of liberating phosphate ions in said metal surface treating agent are used for supplementing the treating agent with phosphate ions. As compounds capable of liberating phosphate ions in said metal surface treating agent, there can be mentioned phosphoric acid; ammonium salts of phosphoric acid, such as triammonium phosphate, diammonium hydrogenphosphate and ammonium dihydrogenphosphate; alkali metal salts of phosphoric acid, such as trisodium phosphate, disodium hydrogenphosphate, sodium dihydrogenphosphate, tripotassium phosphate, etc.; alkaline earth metal salts of phosphoric acid, such as zinc phosphate, magnesium phosphate, etc.; iron phosphate, manganese phosphate, phosphorus molybdate and so on.

The above compounds can be used each alone or in a suitable combination. The addition amount of phosphorus-containing compounds is 0.1 to 10 g/l, preferably 0.25 to 3 g/l, in said metallic surface treating agent. If the amount of phosphorus-containing compounds is less than 0.1 g/l, the corrosion resistance that can be obtained will be insufficient. If the upper limit of 10 g/l is exceeded, the stability of the treating agent tends to deteriorate to an unacceptable level.

The above metallic surface treating agent may further contain other components. As such other components, there can be mentioned tannic acid inclusive of its salt, phytic acid inclusive of its salt, and aqueous resins.

In the method of treating a metallic surface according to the present invention, a metal-coated steel panel, such as a zinc-plated, aluminum-plated and tin-plated steel panel, is first treated with the above metallic surface treating agent. Among metal-coated steel panels, the zinc-coated steel panel is particularly suited to this method. The method of treating a metallic surface may comprise applying said metallic surface treating agent to a substrate metallic surface and drying the coat, or comprise heating such a substrate in advance, applying the metallic surface treating agent of the invention, and allowing the coat to dry by utilizing the residual heat of the substrate.

In both cases, the above drying procedure can be carried out at room temperature to 250° C. for 2 seconds to 5 minutes. If the limit of 250° C. is exceeded, adhesion and corrosion resistance will be adversely affected. The preferred conditions are 40 to 180° C. and 5 seconds to 2 minutes.

In the above method of treating a metallic surface, the amount of deposition of said metallic surface treating agent of the invention is preferably not less than 0.1 mg/m$^2$ as a dry coat thickness. If the dry coat thickness is less than 0.1 mg/m$^2$, the rust-preventive effect will be insufficient. On the other hand, if the dry coat thickness is excessive, it will be uneconomical as an under coat and, in addition, cumbersome procedure-wise. Therefore, the more preferred dry coat thickness is 0.5 to 500 mg/m$^2$, particularly 1 to 250 mg/m$^2$.

In the above method of treating a metallic surface, the mode of use of said metallic surface treating agent of the invention is not particularly restricted. Thus, the routine techniques such as roll coating, shower coating, spray coating, dipping and brush coating can be selectively employed.

In the method of treating a metallic surface according to the present invention, the steel panel subjected to surface treatment with said metallic surface treating agent is further coated with the anticorrosion coating agent and dried. In this anticorrosion coating agent, the following aqueous resin solution or dispersion is employed.

The resin which can be used here includes polyolefin resin, polyurethane resin, acrylic resin, polycarbonate resin, epoxy resin, polyester resin, alkyd resin, phenolic resin, and other thermosetting resins, and these are preferably crosslinkable resins. The above resins may be used in a suitable combination. Particularly preferred is a polyolefin resin, a polyurethane resin or a system comprising those two kinds of resins.

In the above anticorrosion coating agent, the concentration of the resin is 1.0 to 800 g/l, preferably 50 to 400 g/l, on a solid basis. If the formulating amount of the resin exceeds 800 g/l, generally the viscosity is increased to interfere with coating workability. On the other hand, if the amount of the resin is less than 1.0 g/l, a sufficient resin coat may not be obtained so that the corrosion resistance will not be as high as desired.

This anticorrosion coating agent contains a silane compound. The silane compound maybe the same compound as used in the metallic surface treating agent described hereinbefore. The preferred silane compounds are also the same as those already mentioned.

In the anticorrosion coating agent, the concentration of said silane compound is 0.1 to 50 g/l, preferably 0.3 to 20 g/l. If the amount of the silane compound is less than 0.1 g/l, its corrosion resistance-enhancing effect will not be sufficient. If the use of the silane compound is in excess of 50 g/l, the corrosion resistance-enhancing effect will not be improved any further but rather a cost disadvantage will result.

In the anticorrosion coating agent for use in the present invention, water-dispersible silica and a phosphorus-containing ion are formulated in addition to said silane compound to insure sufficient corrosion resistance.

As the water-dispersible silica, all the water-dispersible silicas mentioned for said metallic surface treating agent of the invention can be employed. The concentration of water-dispersible silica in the anticorrosion coating agent is 10 to 500 g/l, preferably 25 to 300 g/l. If the addition amount of water-dispersible silica is less than 10 g/l, the corrosion resistance-enhancing effect will be insufficient. On the other hand, if the limit of 500 g/l is exceeded, the corrosion resistance-enhancing effect will not be improved any further but rather a cost disadvantage will result.

The preferred phosphorus-containing ion includes phosphate ion, phosphite ion and hypophosphite ion. These ions can be supplied by adding compounds capable of liberating the corresponding phosphorus-containing ions in aqueous solution to the anticorrosion coating agent.

The compound capable of liberating phosphate ion in the anticorrosion coating agent includes phosphoric acid; ammonium salts of phosphoric acid such as triammonium phosphate, diammonium hydrogenphosphate, ammonium dihydrogenphosphate, etc.; alkali metal salts of phosphoric acid, such as trisodium phosphate, disodium hydrogenphosphate, sodium dihydrogenphosphate, tripotassium phosphate, etc.; alkaline earth metal salts of phosphoric acid, such as zinc phosphate, magnesium phosphate, etc.; iron phosphate, manganese phosphate and phosphorus molybdate, among others.

The compound capable of liberating phosphite ion includes phosphorous acid, ammonium phosphite, sodium phosphite, potassium phosphite and so on.

The compound capable of liberating hypophosphite ion includes hypophosphorous acid, sodium hypophosphite, ammonium hypophosphite, potassium hypophosphite and so on. These phosphorus-containing ions can be used each alone or in a combination of two or more species in the anticorrosion coating agent according to the present invention.

The concentration of phosphorus-containing ion in the anticorrosion coating agent is 0.1 to 10 g/l, preferably 0.25 to 3 g/l. If the concentration of phosphorus-containing ion is less than 0.1 g/l, the corrosion resistance will be insufficient. If it exceeds 10 g/l, the anticorrosion coating agent will undergo gelation to reduce the storage stability or cause a cost disadvantage because the corrosion resistance-enhancing effect will not be improved any further.

The anticorrosion coating agent of the present invention may be further supplemented with at least one sulfur-containing compound selected from the group consisting of a sulfide, a thiosulfate, a persulfate and a triazinethiol compound to thereby improve corrosion resistance. As the sulfur-containing compound, any of the sulfur-containing compounds mentioned for said metallic surface treating agent can be used.

The concentration amount of said sulfur-containing compound in the anticorrosion coating agent is 0.01 to 100 g/l, preferably 0.25 to 50 g/l, in terms of the amount of sulfide ion, thiosulfate ion, persulfate ion and/or triazine compound. If the concentration of the sulfur-containing compound is less than 0.01 g/l, the corrosion resistance-enhancing effect will be insufficient. On the other hand, if the upper limit of 100 g/l is exceeded, the corrosion resistance-enhancing effect will not be improved any further but rather a cost disadvantage will result.

The anticorrosion coating agent to be used in the present invention may further contain other substances. As such other substances, there can be mentioned a pigment, a surfactant, a solvent and so on.

The pigment that can be used here includes a variety of color pigments inclusive of inorganic pigments, such as titanium dioxide, zinc oxide, zirconium oxide, calcium carbonate, barium sulfate, alumina, kaolin, carbon black, iron oxide, etc., and organic pigments.

In said anticorrosion coating agent, an organic solvent can be formulated for improving the film-forming properties of the resin to thereby yield a more uniform, smooth film. The organic solvent is not particularly restricted as far as it is selected from among the solvents in routine use in coatings, thus including solvents in the alcohol series, ketone series, ester series and ether series, for instance.

In the present invention, said anticorrosion coating agent is coated on a steel panel pretreated with the metallic surface treating agent and dried with a hot air current or, alternatively, said steel panel is heated in advance and the anticorrosion coating agent be then coated on the hot steel panel and allowed to dry by taking advantage of the residual heat of the steel plate.

The heating temperature is 50 to 250° C. regardless of which of the above procedures is taken. If the temperature is less than 50° C. the evaporation of water will be too slow to provide for a satisfactory film and, hence, a sufficient degree of rust-preventing effect. On the other hand, if 250° C. is exceeded, the aqueous resin will undergo pyrolysis so that the salt spray resistance and water resistance will be decreased and the problem of yellowing will also develop. The more preferred heating temperature is 70 to 220° C. When the substrate is heated to dry after coating, the drying time is preferably 1 second to 5 minutes.

The coating amount of said anticorrosion coating agent in the practice of the present invention is preferably equivalent to a dry coat thickness of not less than 0.1 .m. If the dry coat thickness is less than 0.1 .m, the rust-preventing effect of the product steel panel will be insufficient. On the other hand, coating to an excessively large dry coat thickness is too expensive for an under coat and inconvenience is felt in coating. Therefore, the more recommendable is 0.1 to 20 .m, with the range of 0.1 to 10 .m being particularly preferred.

The coating technology for said anticorrosion coating agent of the invention is not particularly restricted but includes roll coating, air-spray coating, airless-spray coating and dip coating, among others.

Production of said anticorrosion coating agent according to the present invention can be carried out typically in the following manner. A reaction vessel is charged with the starting materials, i.e. said aqueous resin composition and water-dispersible silica, and the mixture is heated to a temperature not less than 50° C., preferably not less than 60 °C., but not more than the boiling temperature of the resin composition while it is constantly stirred. Then, a predetermined amount of said silane coupling agent is added dropwise over 1 to 8 hours for reaction while the system is stirred at the same temperature. On completion of the reaction, the product is cooled and said phosphorus-containing compound is added. Optionally, said sulfur-containing compound is further added and, where necessary, the mixture is adjusted with water or a solvent to a predetermined solid content, whereby the anticorrosion coating agent is obtained.

In the above production method, if there action temperature is less than 50° C., the reaction between the silane compound and the aqueous resin and/or water-dispersible silica will not proceed far enough so that the effect of the invention may not be obtained. On the other hand, if the reaction temperature reaches or exceeds the boiling temperature of the resin composition, the evaporation of water will become undesirably violent. The reaction time need be 1 to 8 hours, and a predetermined amount of said silane compound is added within this time period at a rate of 0.1 g/min to 10 g/min. After completion of dropwise addition, the reaction is further continued for about 2 hours. Usually the reaction conditions may be 3 to 5 hours and 80° C.

The method of treating a metallic surface according to the present invention comprises treating a metal-coated steel panel with a metallic surface treating agent containing a silane coupling agent and/or a hydrolytic condensation product thereof, water-dispersible silica, and a zirconium compound and/or a titanium compound and, then, coating it with an anticorrosion coating agent containing a resin, water-dispersible silica and a phosphorus-containing ion. Thus, the present invention provides a method of treating a metallic surface which does not employ chromium and yet is capable of imparting excellent processability and corrosion resistance to a PCM steel plate and a steel plate as obtainable by said method.

In accordance with the present invention, an outstanding rust-preventive effect can be achieved by using, in combination, a resin-free metallic surface treating agent as a primary rust-preventing agent and a resin-containing anticorrosion coating agent as a secondary rust-preventing agent. The suspected mechanism is that as an aqueous solution containing a rust-preventive component alone is applied before application of a resin-containing anticorrosion coating agent, said primary rust-preventing agent is firmly attached in a sufficient amount to the base metal surface to thereby phenomenally enhance the adhesion between the aqueous resin to be applied subsequently and the metal substrate. As a result, even if injuries or other film defects develop in the anticorrosive layer, the firm bond between the rust-preventing agent and the metal surface enables rapid passivation of the metal surface defects by the ionization due to penetrating water to thereby bring about a marked improvement in corrosion resistance. An effect like this can never be provided by a one-coat layer formed with either a metal surface treating agent or a rust-preventing agent-containing resin system.

The steel panel obtainable by the method of the invention has excellent processability and corrosion resistance and, therefore, can be used broadly in such fields as household electrical appliances, computer-related equipment, architectural members, and automotive and other industrial products.

EXAMPLES

The following examples illustrate the present invention in further detail without defining the scope of the invention.

Production Example

Anticorrosion Coating Agent (a)

In a reaction vessel equipped with a drip funnel, thermometer, heating means and stirrer, PC2200 (polyolefin resin; Showei Kagaku) and Bontiter HUX-320 (polyurethane resin; Asahi Denka) were added in a mass ration of 1:1 on a solid basis to pure water at a final resin solid concentration of 15.4% per liter of the resin solution, followed by addition of Snowtex N (water-dispersible silica; Nissan Chemical) in a proportion of 4.6% based on the solid matter of the above resin solution. The temperature was then raised to 80° C. under constant stirring. While this solution was kept stirred, Sila Ace S-510 (-glycidoxytrimethoxysilane; Chisso Corporation) was added dropwise at a rate of 0.1 g/min in a final concentration of 1.5 g/l in the above solution and the mixture was reacted by heating at 80° C. for 3 hours. After the reaction mixture was cooled to not more than 40° C., ammonium secondary phosphate was added and dissolved at a phosphate ion concentration of 1.25 g/l to provide an anticorrosion coating agent (a).

Production Example

Anticorrosion Coating Agent (b)

In a reaction vessel equipped with a drip funnel, thermometer, heating means and stirrer, PC2200 (polyolefin resin; Showei Kagaku) was added to pure water at a final resin solid concentration of 15.4% per liter of resin solution. Then, Snowtex N (water-dispersible silica; Nissan Chemical) was formulated in a proportion of 4.6% based on the solid matter of said resin solution and the temperature was raised to 800° C. under constant stirring. While this reaction mixture was kept stirred, Sila Ace S-510 (-glycidoxytrimethoxysilane; Chisso Corporation) was added dropwise at a rate of 0.1 g/min in a final concentration of 1.5 g/l in said resin solution and the reaction was carried out by heating at 80° C. for 3 hours. After the reaction mixture was cooled to not more than 40° C., ammonium secondary phosphate was added and dissolved at an phosphate ion concentration of 1.25 g/l to provide an anticorrosion coating agent (b).

Production Example

Anticorrosion Coating Agent (c)

In the anticorrosion coating agent (b) obtained in the above production example, ammonium persulfate was added and dissolved at final persulfate ion concentration of 5.0 g/l to provide an anticorrosion coating agent (c).

Production Example

Anticorrosion Coating Agent (d)

In the anticorrosion coating agent (b) obtained in the above production example, ammonium sulfide was added and dissolved at final sulfide ion concentration of 5.0 g/l to provide an anticorrosion coating agent (d).

Production Example

Anticorrosion Coating Agent (e)

In the anticorrosion coating agent (b) obtained in the above production example, ammonium thiosulfate was added and dissolved at final thiosulfate ion concentration of 5.0 g/l to provide an anticorrosion coating agent (e).

Production Example

Anticorrosion Coating Agent (f)

In the anticorrosion coating agent (b) obtained in the above production example, 2,4,6-trimercapto-S-triazone monosodium salt was added and dissolved at a final concentration of 5.0 g/l to provide an anticorrosion coating agent (f).

Example 1

To 1 liter of pure water was added 1.0 g of Sila Ace S-330 (.-aminopropyltriethoxysilane; Chisso Corporation), and the mixture was stirred at room temperature for 5 minutes. Then, 0.5 g of Snowtex N (water-dispersible silica; Nissan Chemical) was added and stirred for 5 minutes. Thereafter, Zircosol AC-7 (ammonium zirconyl carbonate; Daiichi Rare Elements) was added at a final Zr ion concentration of 0.02 g/l, followed by 5 minutes' stirring to provide a metallic surface treating agent. The commercial zinc-electroplated steel panel EG-MO (Japan Test Panel, 70 mm×150 mm×0.4 mm) was spray-degreased with the commercial alkali degreasing agent Surf Cleaner 53S (Nippon Paint) at 60. for 2 minutes, washed with water, and dried. Using a #3 bar coater, the above metallic surface treating agent was coated on the degreased steel panel in a dry film thickness of 25 mg/m$^2$ and dried at a metal surface temperature of 60° C. Then, using a #3 bar coater, the anticorrosion coating agent (a) was coated in a dry film thickness of 1 .m and baked at a metal surface temperature of 150° C. to prepare a testpiece. The corrosion resistance of the testpiece thus obtained and the bath stability of the metallic surface treating agent were evaluated by the methods to be described hereinafter. Then, using a #32 bar coater, Super Lac 100 (acrylic-melamine paint, Nippon Paint) was coated on the above testpiece in a dry film thickness of 20 m and dried at 150° C. for 20 minutes to prepare an overcoat adhesion testpiece. This testpiece was evaluated by the methods to be described hereinafter. The results are shown in Table 1.

Examples 2 to 5 and Comparative Examples 1 and 2

Except that the species and concentrations of silane coupling agent, water-dispersible silica, zirconium compound and sulfur-containing compound were varied as indicated in Table 1, the procedure of Example 1 was otherwise repeated to provide metallic surface treating agents. In addition, the anticorrosion coating agent was replaced with the one indicated in Table 1. Using these metallic surface treating agent and said anticorrosion coating agent, testpieces were prepared in otherwise the same manner as in Example 1. Those testpieces and the metallic surface treating baths were evaluated as in Example 1. The results are shown in Table 1.

Comparative Example 3

Except that the treatment with the metallic surface treating agent was omitted, the procedure of Example 1 was otherwise repeated to prepare and evaluate a test piece and overcoat adhesion test panel. The results are shown in Table 1.

Comparative Example 4

The commercial coating-type chromating agent (resin-containing grade) was coated on the steel panel at a chromate deposition amount of 20 mg/m$^2$ and dried to prepare a corrosion resistance test piece. Then, an overcoat adhesion test panel was prepared and evaluated as in Example 1. The results are shown in Table 1.

Comparative Example 5

The commercial reactive chromating agent was coated at a chromate deposition amount of 20 mg/m$^2$ and dried to prepare a testpiece. Then, a top-coat adhesion test panel was prepared and evaluated as in Example 1. The results are shown in Table 1.

TABLE 1

|  | No. | Coupling agent Kind | Coupling agent g/l | Silica Kind | Silica g/l | Zr compound Kind | Zr compound g/l | Anticorrosion coating agent | Corrosion resistance (300 hr) Flat area | Corrosion resistance (300 hr) Er cup | Overcoat adhesion Primary Cross-cut + Er | Overcoat adhesion Primary Cross-cut + Er | Overcoat adhesion Secondary Cross-cut + Er | Overcoat adhesion Secondary Cross-cut + Er | Bath stability |
|---|---|---|---|---|---|---|---|---|---|---|---|---|---|---|---|
| Ex. | 1 | 1 | 1 | 1 | 0.5 | 1 | 0.02 | a | 10 | 10 | 10 | 10 | 10 | 10 | o |
|  | 2 | 2 | 2.5 | 1 | 1 | 1 | 0.5 | b | 10 | 10 | 10 | 10 | 10 | 10 | o |
|  | 3 | 2 | 90 | 1 | 0.07 | 1 | 4 | b | 10 | 10 | 10 | 10 | 10 | 10 | o |
|  | 4 | 5 | 0.02 | 1 | 1 | 2 | 1 | b | 10 | 9 | 10 | 10 | 10 | 10 | o |
|  | 5 | 4 | 5 | 1 | 90 | 2 | 0.1 | b | 10 | 10 | 10 | 10 | 10 | 10 | o |
| Compar. Ex. | 1 | 1 | 0.005 | 1 | 0.03 | 2 | 0.005 | a | 6 | 3 | 7 | 5 | 5 | 4 | o |
|  | 2 | 2 | 200 | 1 | 200 | 2 | 100 | — |  |  |  |  |  |  | x |
|  | 3 | No surface treating agent | | | | | | a | 6 | 3 | 7 | 5 | 5 | 4 | — |
|  | 4 | Chromating agent (resin-containing grade) | | | | | | — | 3 | 2 | 3 | 2 | 1 | 1 | — |
|  | 5 | Chromating agent (reactive grade) | | | | | | — | 2 | 1 | 5 | 3 | 4 | 4 | — |

Er: Erichsen 7 mm

Examples 6 to 14

Except that the species and concentrations of silane coupling agent, water-dispersible silica, zirconium compound and sulfur-containing compound were changed as shown in Table 2, the procedure of Example 1 was otherwise repeated to prepare metallic surface treating agents. Using these metallic surface treating agents and the anticorrosion coating agents indicated in Table 2, testpieces and overcoat adhesion test panels were prepared in the same manner as in Example 1. The respective testpieces were evaluated by the methods to be described below. The results are shown in Table 2.

Silane Coupling Agent

1: Sila Ace S-330 (.-aminopropyltriethoxysilane; Chisso Corporation)
2: Sila Ace S-510 (.-glycidoxypropyltrimethoxysilane; Chisso Corporation)
3: Sila Ace S-810 (.-mercaptopropyltrimethoxysilane; Chisso Corporation)
4: Sila Ace S-340 (N-(1,3-dimethylbutylidene)-3-(triethoxysilyl)-1-propanamin e; Chisso Corporation)
5: Sila Ace S-210 (vinylmethoxysilane; Chisso Corporation)

Water-dispersible Silica

1: Snowtex N (Nissan Chemical)
2: Snowtex O (Nissan Chemical)

TABLE 2

|  | No. | Coupling Agent Kind | Coupling Agent g/l | Silica Kind | Silica g/l | Zr and/or Ti compound*[1] Kind | Zr and/or Ti compound*[1] g/l | S compound Kind | S compound g/l | Phosphate ion*[2] (g/l) | Anti-corrosion coating agent | Corrosion resistance (300 hr) Flat area | Corrosion resistance (300 hr) Er cup | Overcoat adhesion Primary Cross cut + Er | Overcoat adhesion Primary Cross cut + Er | Overcoat adhesion Secondary Cross cut + Er | Overcoat adhesion Secondary Cross cut + Er | Bath stability |
|---|---|---|---|---|---|---|---|---|---|---|---|---|---|---|---|---|---|---|
| Ex. | 6 | 1 | 2.5 | 2 | 0.5 | 3 | 10 | 2 | 30 | 0 | c | 10 | 9 | 10 | 10 | 10 | 10 | o |
|  | 7 | 3 | 0.5 | 1 | 25 | 2 | 0.5 | 1 | 0.02 | 0 | d | 10 | 9 | 10 | 10 | 10 | 10 | o |
|  | 8 | 2 | 25 | 1 | 5 | 1 | 5 | 3 | 5 | 0 | e | 10 | 10 | 10 | 10 | 10 | 10 | o |
|  | 9 | 1 | 2.5 | 1 | 3 | 1 | 0.5 | 4 | 10 | 0 | f | 10 | 10 | 10 | 10 | 10 | 10 | o |
|  | 10 | 1 | 1 | 2 | 1 | 4 | 1 | 3 | 5 | 0 | e | 10 | 10 | 10 | 10 | 10 | 10 | o |
|  | 11 | 2 | 10 | 1 | 1 | 5 | 2.5 | 3 | 2.5 | 0 | f | 10 | 10 | 10 | 10 | 10 | 10 | o |
|  | 12 | 2 | 2.5 | 1 | 0.5 | 1 + 5 | 0.5 + 2.5 | 3 | 5 | 0 | e | 10 | 10 | 10 | 10 | 10 | 10 | o |
|  | 13 | 2 | 2.5 | 2 | 1 | 1 | 0.5 | 3 | 5 | 1.25 | d | 10 | 10 | 10 | 10 | 10 | 10 | o |
|  | 14 | 2 | 2.5 | 2 | 1 | 1 | 1 | 3 | 5 | 1.25 | d | 10 | 10 | 10 | 10 | 10 | 10 | o |

*[1]expressed in metal ion
*[2]phosphate ion: ammonium secondary phosphate
Er: Erichsen 7 mm As the silane coupling agent, water-dispersible silica, zirconium compound, titanium compound and sulfur-containing compound (S compound) indicated above in Tables 1 and 2, the following commercial products were used.

Zirconium Compound

1: Zircosol AC-7 (ammonium zirconyl carbonate (Daiichi Rare Elements)
2: Ammonium zirconium fluoride (reagent)
3: Zirconium hydrofluoride (reagent)

Titanium Compound

4: Titanium hydrofluoride (reagent)
5: Ammonium titanium fluoride (reagent)

Sulfur Compound

1: Ammonium sulfide (reagent)
2: Ammonium persulfate (reagent)
3: Ammonium thiosulfate (reagent)
4: 2,4,6-Trimercapto-S-triazine monosodium (reagent)

Evaluation Method

In the above Examples 1~12 and Comparative Examples 1~5, the corrosion resistance, overcoat adhesion, and bath stability were evaluated according to the following test protocols and rating schedules.

(A) Corrosion Resistance

The evaluation was made by spraying the surface of each testpiece with 5% NaCl solution at 35° C. and the degree of white rust formation after 300 hours was rated on a 10-point scale. The evaluation was made in both the flat area and the Erichsen 7 mm cupped area. The following rating scale was used.

Score 10 points: no abnormality
9 points: intermediate between 10 points and 8 points
8 points: slight white rust
7 to 6 points: intermediate between 8 and 5 points
5 points: white rust formed over one-half of the whole area
4 to 2 points: intermediate between 5 points and 1 point
1 point: white rust formed over the whole area (B) Overcoat Adhesion (a) Primary Adhesion Test Cross-cut test: An adhesive tape was affixed onto the part of the testpiece which was cross-cut at a 1 mm pitch and the peeling resistance was evaluated on the following 10-point rating scale. Erichsen 7 mm test: To the cupped area of the testpiece as formed at a stroke of 7 mm with an Erichsen tester, a tape was affixed and the peeling resistance was evaluated in the same manner. Cross-cut/Erichsen 7 mm test: The part of the testpiece which was cross-cut at a 1 mm pitch was cupped by 7 mm with an Erichsen tester. An adhesive tape was affixed to the cupped area and the peeling resistance was evaluated in the same manner as above.

The following rating scale was used.

Score 10 points: no peeling
9 points: Percentage of peeled squares . 10%
8 points: Percentage of peeled squares . 20%
7 points: Percentage of peeled squares ☐30%
6 points: Percentage of peeled squares . 40%
5 points: Percentage of peeled squares . 50%
4 points: Percentage of peeled squares . 60%
3 points: Percentage of peeled squares . 70%
2 points: Percentage of peeled squares . 80%
1 point: Percentage of peeled squares . 90%
0 point: Percentage of peeled squares>90%

(b) Secondary Adhesion Test

The testpiece was immersed in boiling water for 30 minutes and then tested using the same test protocol and evaluation scale as in the primary adhesion test.

(C) Bath Stability

The metallic surface treating agent was stored in an incubator at 40° C. for 30 days and, then, evaluated for the degree of gelation or precipitation according to the following evaluation schedule.

◯: no gels or precipitates formed
x: gels or precipitates formed

It is definitely clear from the results presented in Tables 1 and 2, the PCM steel panel treated with a combination of the metallic surface treating agent and anticorrosion coating agent according to the present invention are by far superior to the conventional chromated PCM steel panel in corrosion resistance and top-coat adhesion.

What is claimed is:

1. A method of treating a metallic surface which comprises treating a metal-coated steel panel with a nonchromate metallic surface treating agent, containing, in each liter thereof, (a-1) a silane coupling agent and/or a hydrolytic condensation product thereof in amount of 0.01 to 100 g/l, (a-2) water-dispersible silica in a proportion of 0.05 to 100 g/l (solids), and (a-3) a zirconium compound in an amount of 0.01 to 50 g/l in terms of zirconium ion and/or a titanium compound in an amount of 0.01 to 50 g/l in terms of titanium ion, drying the treated steel panel and coating it with an anticorrosion coating agent containing, in each liter of an aqueous resin solution or dispersion, (b-1) a silane coupling agent and/or a hydrolytic condensation product thereof in an amount of 0.1 to 50 g/l, (b-2) water-dispersible silica in an amount of 10 to 500 g/l (solids) and (b-3) at least one phosphorus-containing ion selected from among phosphate ion, phosphite ion and hypophosphite ion in an amount of 0.1 to 10 g/l, and wherein said nonchromate metallic surface treating agent contains one or more members selected from among sulfide ion, thiosulfate ion, persulfate ion and a triazinethiol compound in a an amount of 0.01 to 100 g/l.

2. The method of treating a metallic surface according to claim 1 wherein said anticorrosion coating agent contains one or more members selected from among sulfide ion, thiosulfate ion, persulfate ion and a triazinethiol compound in an amount of 0.01 to 100 g/l.

3. The method of treating a metallic surface according to claim 1 wherein said anticorrosion coating agent is obtainable by adding said components (b-1) and (b-2) to said aqueous resin solution or dispersion and reacting them at a temperature not less than 50° C. and not more than the boiling temperature of the resin composition.

4. The method of treating a metallic surface according to claim 1 wherein said metal-coated steel panel is a zinc-plated steel panel.

5. A treated steel panel as obtained by the method according to claim 1.

6. The method of treating a metallic surface according to claim 1 wherein said anticorrosion coating agent is obtainable by adding said components (b-1) and (b-2) to said aqueous resin solution or dispersion and reacting them at a temperature not less than 50° C. and not more than the boiling temperature of the resin composition and coating agent contains one or more members selected from among sulfide ion, thiosulfate ion, persulfate ion and a triazinethiol compound in an amount of 0.01 to 100 g/l.

7. The method of treating a metallic surface according to claim 2 wherein said metal-coated steel panel is a zinc-plated steel panel.

8. The method of treating a metallic surface according to claim 3 wherein said metal-coated steel panel is a zinc-plated steel panel.

9. A treated steel panel as obtained by the method according to claim 2.

10. A treated steel panel as obtained by the method according to claim 3.

11. A treated steel panel as obtained by the method according to claim 4.

* * * * *